United States Patent
Sugiyama

(10) Patent No.: US 9,699,345 B2
(45) Date of Patent: Jul. 4, 2017

(54) PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Hideki Sugiyama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/736,756

(22) Filed: Jun. 11, 2015

(65) Prior Publication Data
US 2015/0373221 A1    Dec. 24, 2015

(30) Foreign Application Priority Data

Jun. 20, 2014  (JP) .................. 2014-127599

(51) Int. Cl.
*H04N 1/00* (2006.01)
(52) U.S. Cl.
CPC .............. *H04N 1/00949* (2013.01)
(58) Field of Classification Search
CPC ....... H04N 2201/0094; H04N 1/00896; H04N 1/00885
See application file for complete search history.

(56) References Cited

U.S. PATENT DOCUMENTS

| | | | |
|---|---|---|---|
| 8,707,309 B2 | 4/2014 | Sakou | .................... 718/101 |
| 2006/0026597 A1* | 2/2006 | Sakou | ............ H04N 1/00885 718/100 |
| 2012/0239172 A1* | 9/2012 | Nishiyama | ............ G05B 19/05 700/86 |

FOREIGN PATENT DOCUMENTS

JP    2006-041971 A    2/2006

* cited by examiner

*Primary Examiner* — Iriana Cruz
(74) *Attorney, Agent, or Firm* — Fitzpatrick, Cella, Harper & Scinto

(57) ABSTRACT

A processing apparatus capable of registering applications which periodically execute processes manages one of a plurality of applications registered with the processing apparatus, as a reference application. When registering a new application, the processing apparatus sets an execution cycle of the new application based on an execution cycle of the reference application if the execution cycle of the new application is modifiable, but changes the reference application to be managed to the new application if the execution cycle of the new application is not modifiable.

6 Claims, 14 Drawing Sheets

| | APP ID | NEXT EXECUTION DATE/TIME | EXECUTION CYCLE | REQUESTED CYCLE | MODIFIABILITY | REDUCIBLE RANGE | EXTENDABLE RANGE | REFERENCE APP ID |
|---|---|---|---|---|---|---|---|---|
| 511~ | 001 | 6/30 10:00 | 590 | 600 | YES | 60 | 60 | 004 |
| 512~ | 002 | 6/30 10:00 | 590 | 600 | YES | 30 | 30 | 004 |
| 513~ | 003 | 6/30 10:00 | 1180 | 1100 | YES | 100 | 200 | 004 |
| 514~ | 004 | 6/30 10:00 | 590 | 1100 | NO | 0 | 0 | 004 |

FIG. 5A

| | 501 | 502 | 503 | 504 | 505 | 506 | 507 | 508 |
|---|---|---|---|---|---|---|---|---|
| | APP ID | NEXT EXECUTION DATE/TIME | EXECUTION CYCLE | REQUESTED CYCLE | MODIFIABILITY | REDUCIBLE RANGE | EXTENDABLE RANGE | REFERENCE APP ID |
| 511 | 001 | 6/30 10:00 | 600 | 600 | YES | 60 | 60 | 001 |

FIG. 5B

| | APP ID | NEXT EXECUTION DATE/TIME | EXECUTION CYCLE | REQUESTED CYCLE | MODIFIABILITY | REDUCIBLE RANGE | EXTENDABLE RANGE | REFERENCE APP ID |
|---|---|---|---|---|---|---|---|---|
| 511 | 001 | 6/30 10:00 | 600 | 600 | YES | 60 | 60 | 001 |
| 512 | 002 | 6/30 10:00 | 600 | 600 | YES | 30 | 30 | 001 |

FIG. 5C

| APP ID | NEXT EXECUTION DATE/TIME | EXECUTION CYCLE | REQUESTED CYCLE | MODIFIABILITY | REDUCIBLE RANGE | EXTENDABLE RANGE | REFERENCE APP ID |
|---|---|---|---|---|---|---|---|
| 001 | 6/30 10:00 | 600 | 600 | YES | 60 | 60 | 001 |
| 002 | 6/30 10:00 | 600 | 600 | YES | 30 | 30 | 001 |
| 003 | 6/30 10:00 | 1200 | 1100 | YES | 100 | 200 | 001 |

FIG. 5D

| APP ID | NEXT EXECUTION DATE/TIME | EXECUTION CYCLE | REQUESTED CYCLE | MODIFIABILITY | REDUCIBLE RANGE | EXTENDABLE RANGE | REFERENCE APP ID |
|---|---|---|---|---|---|---|---|
| 001 | 6/30 10:00 | 590 | 600 | YES | 60 | 60 | 004 |
| 002 | 6/30 10:00 | 590 | 600 | YES | 30 | 30 | 004 |
| 003 | 6/30 10:00 | 1180 | 1100 | YES | 100 | 200 | 004 |
| 004 | 6/30 10:00 | 590 | 1100 | NO | 0 | 0 | 004 |

F I G. 12

| From | PROCESSING DETAILS | PROTOCOL | PREVIOUS EXECUTION DATE/TIME | AVERAGE TIME INTERVAL | RECEPTION COUNT |
|---|---|---|---|---|---|
| 172.10.10.10 | STATUS ACQUISITION | SNMP | 6/30 10:05:11 | 600 | 10 |
| 172.20.20.20 | JOB LIST ACQUISITION | SNMP | 6/30 10:49:01 | 3600 | 5 |

FIG. 14

| | 501 | 502 | 503 | 504 | 505 | 506 | 507 | 508 | 1401 |
|---|---|---|---|---|---|---|---|---|---|
| | APP ID | NEXT EXECUTION DATE/TIME | EXECUTION CYCLE | REQUESTED CYCLE | MODIFIABILITY | REDUCIBLE RANGE | EXTENDABLE RANGE | REFERENCE APP ID | DELAY TIME |
| 1411 | 001 | 6/30 10:00 | 600 | 600 | YES | 60 | 60 | 001 | 0 |
| 1412 | 002 | 6/30 10:00 | 600 | 600 | YES | 30 | 30 | 001 | 10 |

PROCESSING APPARATUS, METHOD FOR CONTROLLING THE SAME, AND STORAGE MEDIUM

BACKGROUND OF THE INVENTION

Field of the Invention

The present invention relates to a processing apparatus, a method for controlling the processing apparatus, and a storage medium.

Description of the Related Art

In recent years, there has been demand to reduce power consumption of office equipment from the viewpoint of environmental protection. To achieve reduction of power consumption, a technique is known for putting office equipment such as a copier into a power saving mode in which power supply to resources (printing unit, reading unit, display unit, control unit, and the like) in the equipment is stopped when a standby state in which the equipment remains idle continues for a predetermined period of time.

A multifunction peripheral (multifunction processing apparatus) having plural functions including a copy function, printer function, and scanner function is equipped with various functions (periodic processes) which operate periodically. When executing these periodic processes, even if the multifunction peripheral is operating in power saving mode, the multifunction peripheral returns to normal operation mode for these processes. Consequently, there is a problem in that when the number of these periodic processes increases, the time period in which the multifunction peripheral operates in power saving mode is reduced, making it impossible to achieve reduction of power consumption.

For example, Japanese Patent Laid-Open No. 2006-41971 describes a method for removing factors which obstruct such reduction of power consumption. The method stores a start time and execution cycle of a first periodic process, and when a start time and execution cycle of a second periodic process is set, the method brings a start time of the second periodic process into coincidence with the start time of the first periodic process.

According to the invention described in Japanese Patent Laid-Open No. 2006-41971, by bringing the first start time of the second periodic process into coincidence with the next start time of the first periodic process, it is possible to prevent the operation mode of the multifunction peripheral from returning to a normal mode when the second periodic process is started. However, if the execution cycles of the first periodic process and second periodic process do not match, the second and subsequent start times of the first and second periodic processes do not coincide with each other, increasing the number of returns to normal operation mode and thereby obstructing reduction of power consumption.

SUMMARY OF THE INVENTION

The present invention enables realization of a technique for executing periodic processes of plural applications in synchronization and thereby preventing the periodic processes from obstructing reduction of power consumption.

One aspect of the present invention provides a processing apparatus capable of registering applications which periodically execute processes, comprising: a management unit configured to manage one of a plurality of applications which have been registered with the processing apparatus, as a reference application; a registration unit configured to register a new application with the processing apparatus; a determination unit configured to determine whether or not an execution cycle of the new application is modifiable; a setting unit configured to set the execution cycle of the new application based on an execution cycle of the reference application in a case where it is determined that the execution cycle of the new application is modifiable; and a changing unit configured to change the reference application managed by the management unit to the new application in a case where it is determined that the execution cycle of the new application is not modifiable.

Another aspect of the present invention provides a method for controlling a processing apparatus capable of registering applications which periodically execute processes, the method comprising: managing one of a plurality of applications which have been registered with the processing apparatus, as a reference application; registering a new application with the processing apparatus; determining whether or not an execution cycle of the new application is modifiable; setting the execution cycle of the new application based on an execution cycle of the reference application if it is determined that the execution cycle of the new application is modifiable; and changing the reference application managed by the managing to the new application in a case where it is determined that the execution cycle of the new application is not modifiable.

Further features of the present invention will be apparent from the following description of exemplary embodiments with reference to the attached drawings.

BRIEF DESCRIPTION OF THE DRAWINGS

The accompanying drawings are included in the specification, making up part of the specification and illustrating embodiments of the present invention, and are used to describe principles of the present invention together with description of the embodiments.

FIGS. 5A to 5D are diagrams showing an exemplary data organization of an application management table according to the first embodiment.

FIG. 12 is a diagram showing an example of packet information retained temporarily in S1107.

FIG. 14 is a diagram showing an example of an application management table according to a third embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
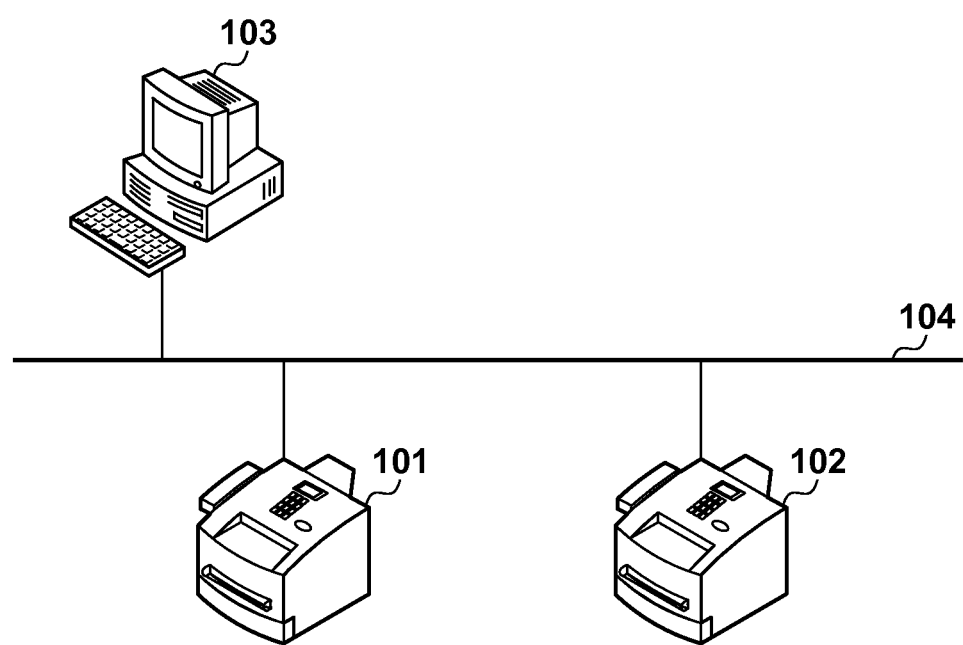
FIG. 1 is a diagram describing an example of a system configuration including multifunction peripherals (MFPs) which are an example of an image processing apparatus according to a first embodiment of the present invention.

FIG. 1 is a diagram describing an example of a system configuration including multifunction peripherals (MFPs) 101 and 102 which are an example of a multifunction processing apparatus according to a first embodiment of the present invention.

As shown in FIG. 1, in the first embodiment, the MFPs 101 and 102 are connected with a server (PC) 103 through a network 104 such as a LAN in such a way as to be able to communicate with each other. The MFPs 101 and 102 request screen information to be displayed on an operation screen of the MFPs from the server 103, which then generates the requested screen information and transmits the screen information to the requesting MFPs.

Figure 2:
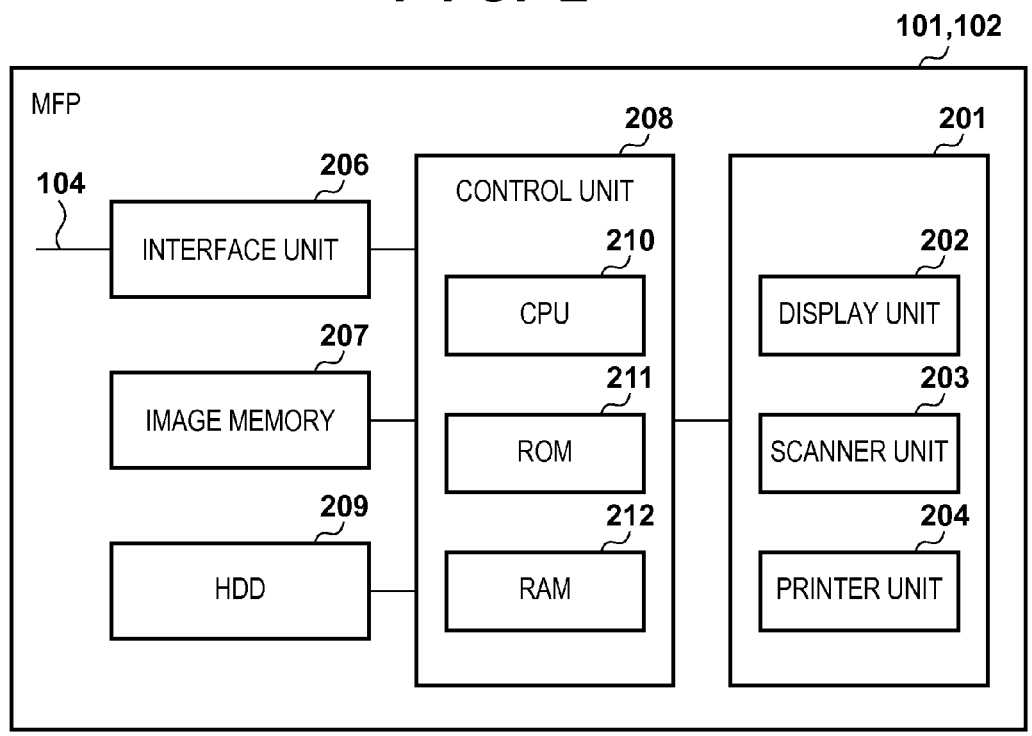
FIG. 2 is a block diagram describing a configuration of the MFP according to the first embodiment.

FIG. 2 is a block diagram describing a configuration of the MFP 101 (102) according to the first embodiment. Note that since the MFPs 101 and 102 are identical in basic configuration, the MFP 101 will be described herein.

In FIG. 2, the control unit 208 includes a CPU 210, a ROM 211, and RAM 212, and controls operation of the entire MFP 101. Based on a boot program stored in the ROM 211, the CPU 210 reads a control program stored in the HDD 209, loads the control program into the RAM 212, and executes various control processes such as read control and transmit control according to the loaded program. Note that the control program may be stored in the ROM 211. The RAM 212 is used as a main memory and work area of the CPU 210. Also, the control unit 208 is connected with a functional part 201 including a display unit 202, scanner unit 203, and printer unit 204, and controls operation of these units. A liquid-crystal or other display unit equipped with a touch panel function as well as a key-board are placed on the display unit 202. Also, the display unit 202 is equipped with a browser function, and the browser analyzes an HTML file received from the server 103 and displays the operation screen on the display unit 202 based on description in the analyzed HTML file. The printer unit 204 prints an image on a sheet based on image data outputted from the control unit 208. The scanner unit 203 reads an image from an original, generates image data, and outputs the image data to the control unit 208.

An interface unit 206 connects the control unit 208 to the network 104 to receive image data for printing or screen data to be displayed on the display unit 202 from an external information processing apparatus (PC: not shown). The HDD 209 stores image data, a table (described later), various programs, and the like. Note that the image data for printing received from the external information processing apparatus is temporarily stored in the image memory 207, and printed by the printer unit 204 via the control unit 208.

Figure 3:
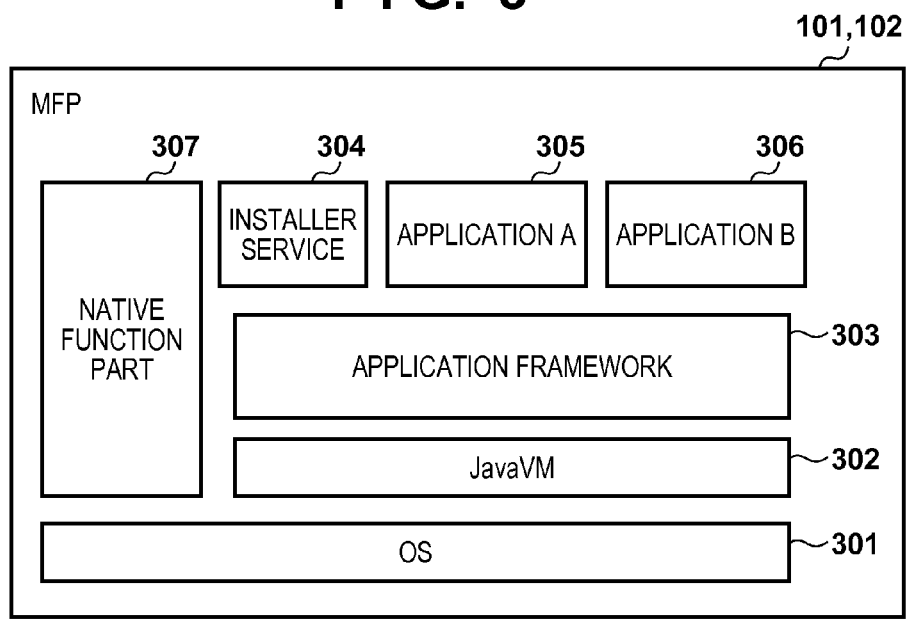
FIG. 3 is a diagram showing an example of a software architecture of the MFP according to the first embodiment.

FIG. 3 is a diagram showing an example of a software architecture of the MFP 101 according to the first embodiment. Note that software components shown in FIG. 3 are stored in the ROM 211 or HDD 209 and executed by the CPU 210.

Generally, a real-time OS is used in an OS (operating system) layer 301, but a general-purpose OS such as Linux (registered trademark) may be used. Java VM 302 is a virtual machine for Java (registered trademark) and the like, which provides an application execution environment. An application framework 303 provides a function to manage a life cycle of an application. The application framework 303 includes a periodic process control unit 401 (FIG. 4) described later. An installer service 304 performs an installation process by registering plural applications such as application A and application B (described later) in the application framework 303. Having been installed by the installer service 304, application A 305 and application B 306 provide various functions on the MFP 101. For example, application A 305 can acquire status from the MFP 101 and display status information on the display unit 202. Also, application B 306 acquires consumables information on the MFP 101 and transmits the information regularly to a PC and the like on the network 104 via the interface unit 206. These applications 305 and 306 i.e., application A and application B, can be installed by being downloaded from outside the MFP 101. Native functions part 307 provide built-in functions of the MFP 101. For example, a function to do printing on the printer unit 204 based on print data received via the interface unit 206 is an example of native functions. In the first embodiment, it is assumed that the Java VM 302, the application framework 303, application A 305, and application B 306 are stored in the HDD 209. Also, it is assumed that the native functions part 307 are stored in the ROM 211.

Figure 4A:
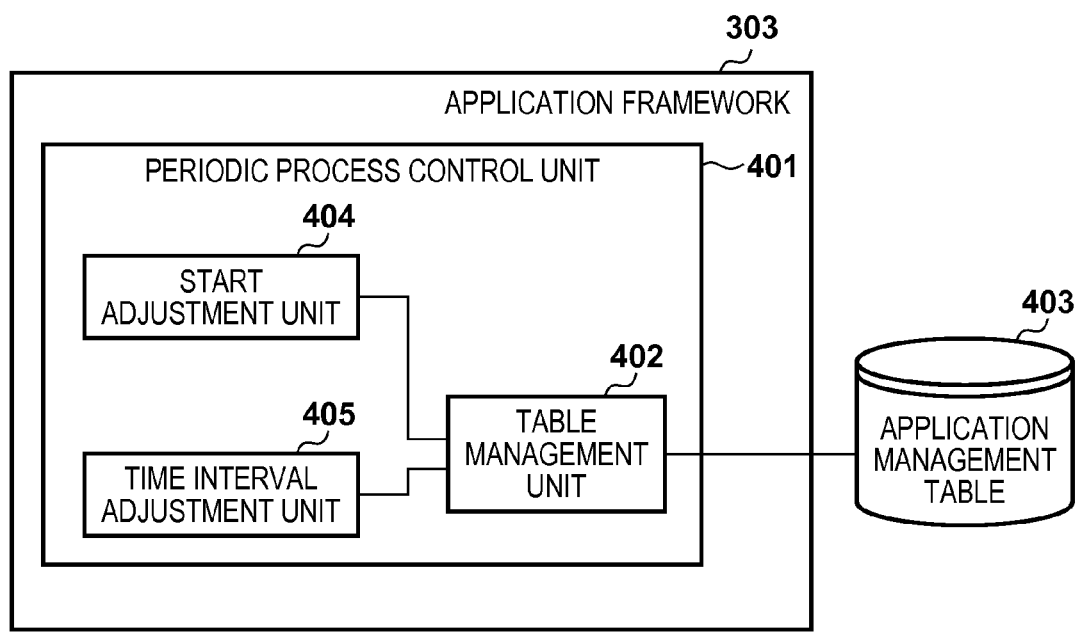
FIGS. 4A and 4B are block diagrams showing configuration examples of a periodic process control unit according to the first embodiment or a second embodiment of the present invention.

FIG. 4A is a block diagram showing a configuration example of a periodic process control unit 401 provided in the application framework 303 of the MFP according to the first embodiment of the present invention.

The periodic process control unit 401 controls execution of various functions which operate periodically. The periodic process control unit 401 includes a start adjustment unit 404, a time interval adjustment unit 405, a table management unit 402, and an application management table 403. The table management unit 402 creates a table for use to manage information on a periodic process of each application in the HDD 209 or the like and manages the table. By referring to the application management table 403, the start adjustment unit 404 and time interval adjustment unit 405 adjust execution timing of the periodic process of each application and modifies the application management table 403 as required. Also, using a function of the application framework 303, the periodic process control unit 401 can intercommunicate with application A 305 and application B 306. Also, from application A 305 and application B 306, the periodic process control unit 401 can register a callback function and can call the registered callback function as well.

FIG. 5A is a diagram showing an exemplary data organization of the application management table 403 according to the first embodiment, where one application has been registered.

App ID 501 is an ID of an application which performs a periodic process. For example, "001" has been registered in row 511 as the application ID. Next Execution Date/Time 502 indicates the execution date/time when the application executes a periodic process the next time. For example, in row 511, "6/30 10:00" (10 AM on June 30) has been registered as the next execution date/time. Execution Cycle 503 is the duration (sec.) of each execution cycle of the periodic process executed by the application. For example, "600" (sec.) has been registered as the execution cycle in row 511. Requested Cycle 504 is a requested value (requested cycle) of an execution time interval of the periodic process request by the application at the time of registration of the application. For example, "600" (sec.) has been registered as the requested cycle in row 511. Modifiability 505 indicates whether the execution cycle and execution date/time of the periodic process executed by the application can be changed. For example, "Yes" has been registered as modifiability in row 511, meaning that changes can be made. Reducible Range 506 indicates a range by which the execution cycle requested by the application can be shortened. For example, since "60" (sec.) has been registered as the reducible range in row 511, a minimum value of the execution cycle can be changed down to 540 (sec.) (=600−60). Extendable Range 507 indicates a range by which the execution cycle requested by the application can be extended. For example, since "60" (sec.) has been registered as the extendable range in row 511, a maximum value of the execution cycle can be changed up to 660 (sec.) (=600+60). Reference App ID 508 registers an ID of a reference application which executes a periodic process with a timing serving as a reference for the periodic process executed by the application. For example, "001", i.e., the own application ID, has been registered as the reference application ID in row 511. That is, this application has an ID of "001", the requested value of the execution cycle of the periodic process executed by the application is 600 seconds, and a modifiable range of the execution cycle is 540 to 660 seconds. Also, it is indicated that the execution cycle of the application has been requested as being 600 seconds by the periodic process control unit 401.

Figure 6:
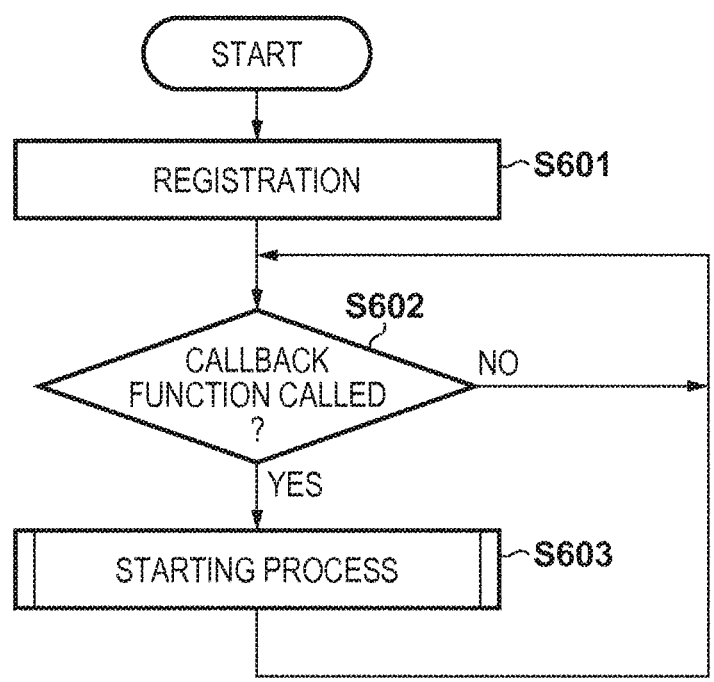
FIG. 6 is a flowchart describing a flow of basic processes from registration to execution of a periodic process of an application on the MFP according to the first embodiment.

FIG. 6 is a flowchart describing a flow of basic processes from registration to execution of a periodic process of an application on the MFP 101 according to the first embodiment. Steps are carried out as the CPU 210 loads an application program stored in the ROM 211 or HDD 209 into the RAM 212 and executes the program. Description of application-specific processes such as an initialization process, shut-down process, and installation process of the application are omitted here for simplicity of explanation, and common processes including registration and execution of a periodic process will be described. Also, description of details of the periodic process such as acquisition of status will be omitted. There may be cases in which one application performs plural periodic processes such as a status acquisition process and an upload process with respect to a server. The processes shown in this flowchart are started each time execution of the periodic process is started.

First, in S601, the application registers a periodic process. Here, the application communicates with the periodic process control unit 401 according to predetermined procedures, sends information needed to create a table shown in FIG. 5A, and registers a periodic process as a callback function. As the periodic process control unit 401 calls the registered callback function, the periodic process is executed. Next, in S602, the application waits until the callback function registered in S601 is called by the periodic process control unit 401. Then, when it is determined in S602 that the callback function is called, the application goes to S603 and performs the process of the callback function. Otherwise, the application goes to S602.

Figure 7:
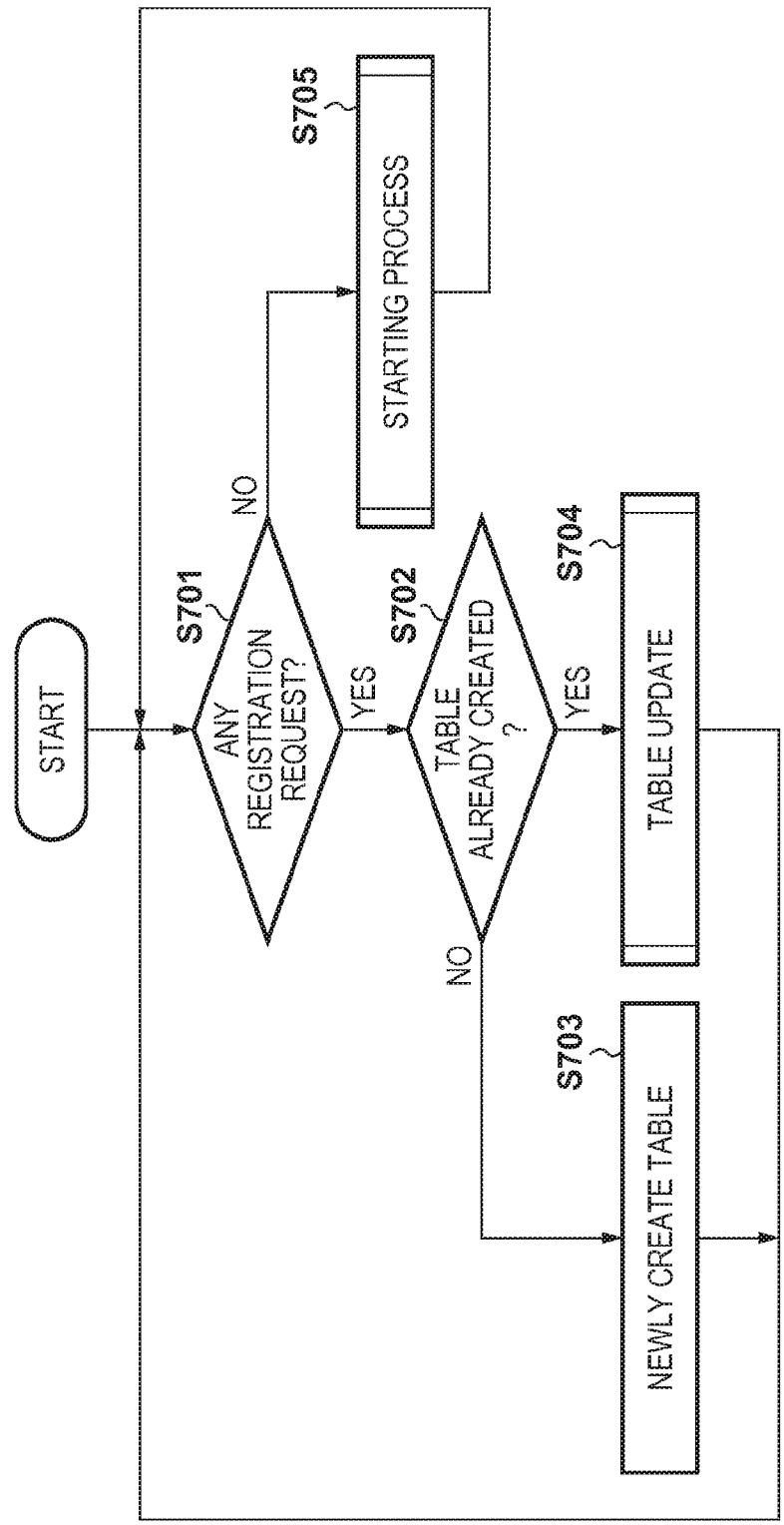
FIG. 7 is a flowchart describing basic operations of the periodic process control unit of the MFP according to the first embodiment.

FIG. 7 is a flowchart describing basic operations of the periodic process control unit 401 of the MFP 101 according to the first embodiment. The process shown in the flowchart is carried out as the CPU 210 loads an application program stored in the ROM 211 or HDD 209 into the RAM 212 and executes the program. Note that the process is described here as being performed by the periodic process control unit 401.

First, in S701 the periodic process control unit 401 determines whether there is any application registration request. That is, if an application performs a registration process in S601 of FIG. 6 by communicating with the periodic process control unit 401 using a function of the application framework 303, it is determined that there is an application registration request. If it is determined that there is an application registration request, the periodic process control unit 401 receives the information and callback function sent from the application in S701. Then, in S702, the periodic process control unit 401 determines whether an application management table 403 has been created. That is, the periodic process control unit 401 determines whether an application management table 403 has been created in a storage unit such as the HDD 209. If it is determined in S702 that an application management table 403 has not been created, the periodic process control unit 401 goes to S703, newly creates an application management table 403, saves the table in the HDD 209, and goes to S701. Here, an application management table 403 such as that shown, for example, in FIG. 5A is created and saved in the HDD 209. For example, as initial values, "1" is set in App ID 501 and "1" indicating the own application ID is set in Reference App ID 508. Furthermore, the requested cycle (e.g., 600 indicating 600 sec.) of the periodic process received from the application in S701 is set in Execution Cycle 503 and Requested Cycle 504. Furthermore, Modifiability 505 is set to "Yes" meaning that changes can be made, and Next Execution Date/Time 502 is set to the date/time (6/30 10:00) obtained by adding the requested cycle to the current date/time (e.g., 6/30 9:50). Furthermore, Reducible Range 506 and Extendable Range 507 are set, respectively, to the reducible range (e.g., 60 meaning 60 sec.) and extendable range (e.g., 60 meaning 60 sec.) by which the period (time interval) of the periodic process received from the application in S701 can be changed.

On the other hand, if it is determined in S702 that an application management table 403 has been created, the periodic process control unit 401 goes to S704, updates the application management table 403 on the HDD 209, and goes to S701. Details of the update process for the application management table 403 will be described later.

Also, if it is determined in S701 that there is no application registration request, the periodic process control unit 401 goes to S705, executes a starting process of the periodic process described later, and returns to S701.

Figure 8:
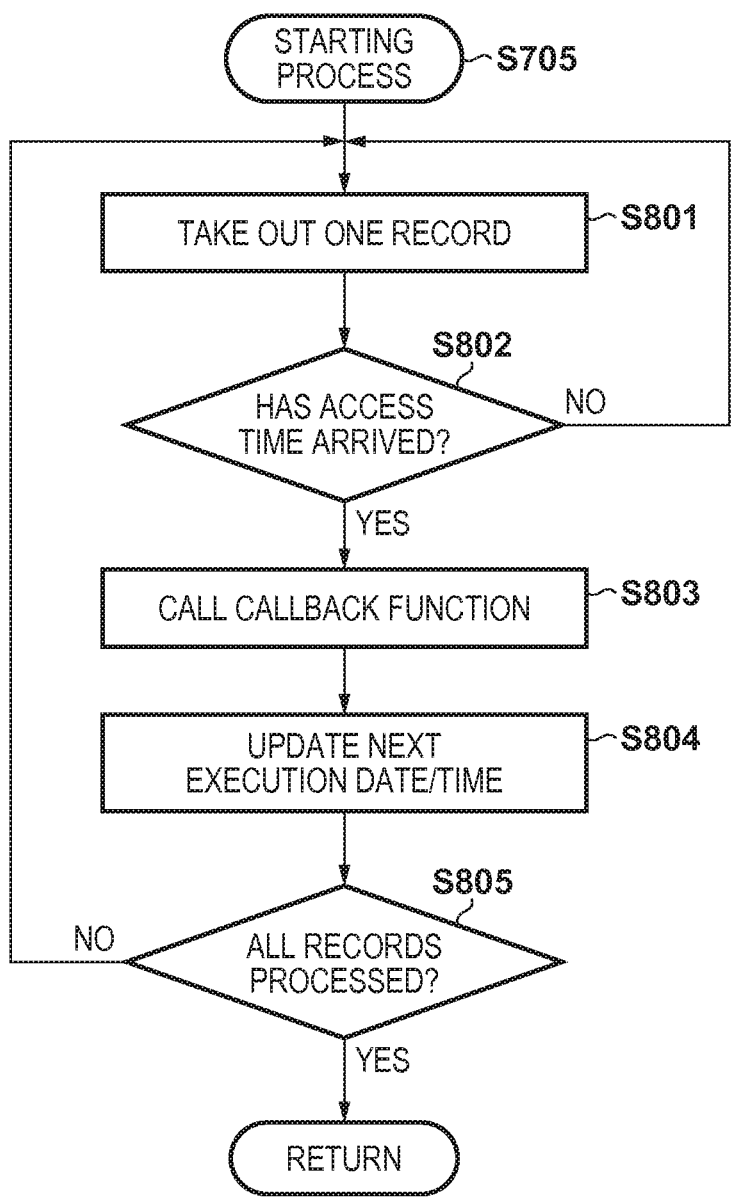
FIG. 8 is a flowchart describing a starting process of S705.

FIG. 8 is a flowchart describing a starting process of S705.

In S801, with reference to the application management table 403, the periodic process control unit 401 acquires information (a record) on one application registered therein and saves the information in a work area reserved in the RAM 212. Next, in S802, the periodic process control unit 401 determines whether or not an access time of the application has arrived. Here, the application whose next execution date/time registered in the application management table 403 has passed the current date/time is determined to have reached the access time. If it is determined in S802 that the access time has not arrived, the periodic process control unit 401 goes to S801 and acquires a next record, but if it is determined that the access time has arrived, the periodic process control unit 401 goes to S803 and calls a callback function registered by the application acquired in S801. Then, the periodic process control unit 401 goes to S804 and updates the next execution date/time. Here, the periodic process control unit 401 adds the value of the application's execution cycle to the value of the application's next execution date/time acquired in S801, and saves the resulting value in the application's Next Execution Date/Time 502 of the application management table 403. Then, the periodic process control unit 401 goes to S805 and determines whether or not the above process has been completed for all the information (records) on the application in the application management table 403. If it is determined in S805 that all the records have been processed, the starting process of the periodic process is finished. If it is determined in S805 that the process has not been completed for all the records, the periodic process control unit 401 goes to S801 and repeats the above process.

Figure 9:
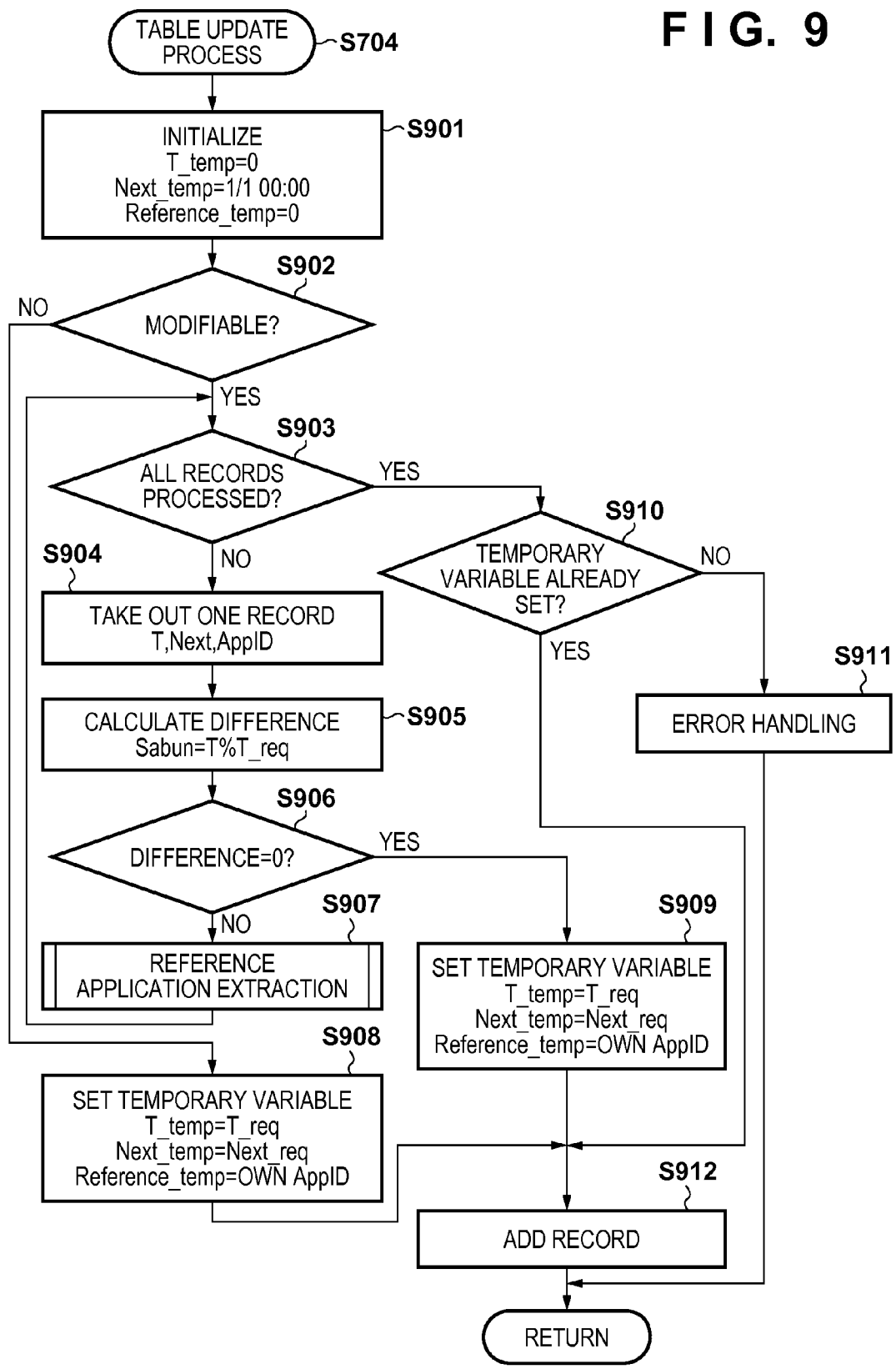
FIG. 9 is a flowchart describing an application management table update process in S704 of FIG. 7.

FIG. 9 is a flowchart describing an update process for the application management table 403 in S704 of FIG. 7. If it is determined in S701 that there is an application registration request, the periodic process control unit 401 has received information about the periodic process from the application which is the issuer of the registration request. Also, the periodic process control unit 401 has passed the received information to the table management unit 402.

First, in S901, the table management unit 402 sets the next execution date/time, the requested cycle, the reducible range and extendable range by which the requested cycle can be changed, and the modifiability of the requested cycle received from periodic process control unit 401 in variables Next_req, T_req, min and max, and modifiable, respectively. The variables T_req (requested cycle), Next_req (execution date/time), min (reducible range), max (extendable range), modifiable (modifiability) are stored in the RAM 212. Furthermore, the table management unit 402 initializes various variables described later. Here, the table management unit 402 sets variables T_temp, Next_temp, and Reference_temp reserved in the RAM 212 at "0", "1/1 00:00", and "0", respectively, where T_temp, Next_temp, and Reference_temp are variables which represent the execution cycle, the next execution date/time, and the ID of the reference application, respectively.

Next, in S902, the table management unit 402 determines whether or not the execution cycle of the periodic process is modifiable. That is, the table management unit 402 checks the value of the variable modifiable, and determines that the execution cycle is modifiable if the value indicates that changes can be made. If it is determined that the execution cycle is not modifiable, the table management unit 402 goes to S908 and changes the variables to the requested values acquired in S901. That is, the table management unit 402 sets the variables T_temp, Next_temp, and Reference_temp to the value of the variable T_req, value of the Next_req, and ID of the own application ID, respectively, and then goes to S912. In this way, the periodic process of the application whose execution cycle cannot be changed is executed according to the execution cycle requested by the application.

On the other hand, if it is determined in S902 that the execution cycle is modifiable, the table management unit 402 goes to S903 and determines whether all the records in the application management table 403 have undergone the process of S904 and subsequent processes (described later). If it is determined in S903 that all the records have been processed, the table management unit 402 goes to S910. Otherwise, the table management unit 402 goes to S904 and acquires one record of application information from the application management table 403. Furthermore, the table management unit 402 sets the execution cycle, next execution date/time, and application ID from the acquired one record of application information in variables T, Next, and AppID, respectively. The variables T, Next, and AppID are stored in a storage area of a work area provided beforehand in the RAM 212.

Next, in S905, the table management unit 402 calculates a difference (out of sync amount) between the execution cycle of an already registered application and the requested cycle of the application issuing the registration request. That is, the table management unit 402 divides the variable T acquired in S904 by the requested cycle T_req and sets the remainder as the difference (diff). Thus, the difference (diff) is also expressed by mod (T, T_req). For example, in the example in FIG. 5C, when the requested cycle T_req is "1100" and the period T of the already registered application is "600", the difference (diff) is "600". The variable diff is saved in the storage area of the RAM 212. Next, in S906, the table management unit 402 determines whether the difference (out of sync amount) found in S905 is 0. This is equivalent to determining whether the value of the variable diff is "0". Here, if it is determined that the value of the variable diff is "0", this means that the execution cycle of the acquired record is an integer multiple of the requested cycle. If it is determined in S906 that the difference is not "0", the table management unit 402 goes to S907, executes a reference application extraction process described later with reference to FIG. 10, and then goes to S903.

On the other hand, if it is determined in S906 that the difference is "0", the table management unit 402 goes to S909 and changes a temporary variable based on the value acquired in S904. That is, the table management unit 402 sets the variables T_temp, Next_temp, and Reference_temp to the values of the requested cycle T_req, variable Next, and own application ID, respectively, and goes to S912. Consequently, the next execution date/time and execution cycle of the application issuing the registration request become equal to the next execution date/time (variable Next) and execution cycle (variable T) of the already registered application while the reference application ID becomes equal to the application ID of the already registered application. An example of data thus registered in S912 is shown in FIG. 5B. Note that of FIG. 5B shows a case in which the variable T and requested cycle T_req coincide with each other.

Also, if it is determined in S903 that all the records have been processed, the table management unit 402 goes to S910 and determines whether a temporary variable has been set. Here, if the variable T_temp is not "0", it is determined that a temporary variable has been set. If it is determined in S910 that a temporary variable has been set, the table management unit 402 goes to S912, but if it is determined that a temporary variable has not been set, the table management unit 402 goes to S911 and executes error handling.

Thus, the error handling is executed when the following two conditions are met simultaneously. (1) There is no application whose execution cycle is equal to the execution cycle or an integer multiple thereof of the periodic process requested by the application requesting to be registered, among the applications managed by the application management table 403. (2) There is no application whose execution cycle falls within a modifiable range (range between the requested cycle plus the extendable range and the requested cycle minus the reducible range) of the cycle requested by the requesting application.

Also, in the error handling, a message is sent to the requesting application as well, prompting the application to change the execution cycle or change the modifiable range of the execution cycle.

In S912, the table management unit 402 adds the application requesting to be registered to the application management table 403. That is, one entry is added to the application management table 403, and the items including those set in S908 or S908 are registered. In so doing, an ID which identifies the application is set in App ID 501, the value of the variable Next_temp is set in Next Execution Date/Time 502, and the value of the variable T_temp is set in Execution Cycle 503. Also, the value of T_req is set in Requested Cycle, the value of the variable modifiable is set in Modifiability 505, the value of the variable min is set in Reducible Range 506, and the value of the variable max is set in Extendable Range 507. Furthermore, the value of Reference_temp is set in Reference App ID.

For example, FIG. 5B shows an example in which a second application with an application ID of "002" is added to a first application already registered as shown in FIG. 5A. Row 512 shows data of the second application. Here, the requested cycle of the second application is 600 seconds, which coincides with the 600-second execution cycle of the first application. Thus, Reference App ID 508 of the second application coincides with "001" of the first application while Next Execution Date/Time 502 coincides with the next execution date/time of the first application.

Also, FIG. 5C shows an example in which a third application with an application ID of "003" has been added to the application management table 403. Row 513 shows data of the third application. It can be seen that the third application is making a registration request at the current time "9:48", specifying "1100" for Requested Cycle 504, "100" for Reducible Range 506, and "200" for Extendable Range 507. Therefore, the execution cycle of the third application can take a value in a range of 1000 to 1200 seconds. Thus, in this case, based on the execution cycle (600 sec.) of the first application, the execution cycle of the third application is registered by being adjusted to "1200" seconds, which is a multiple of the execution cycle of the first application. This allows the periodic processes of the first to third applications to be executed in synchronization, making it possible to reduce the number of times the periodic processes have to return from power saving mode to normal mode.

Figure 10:
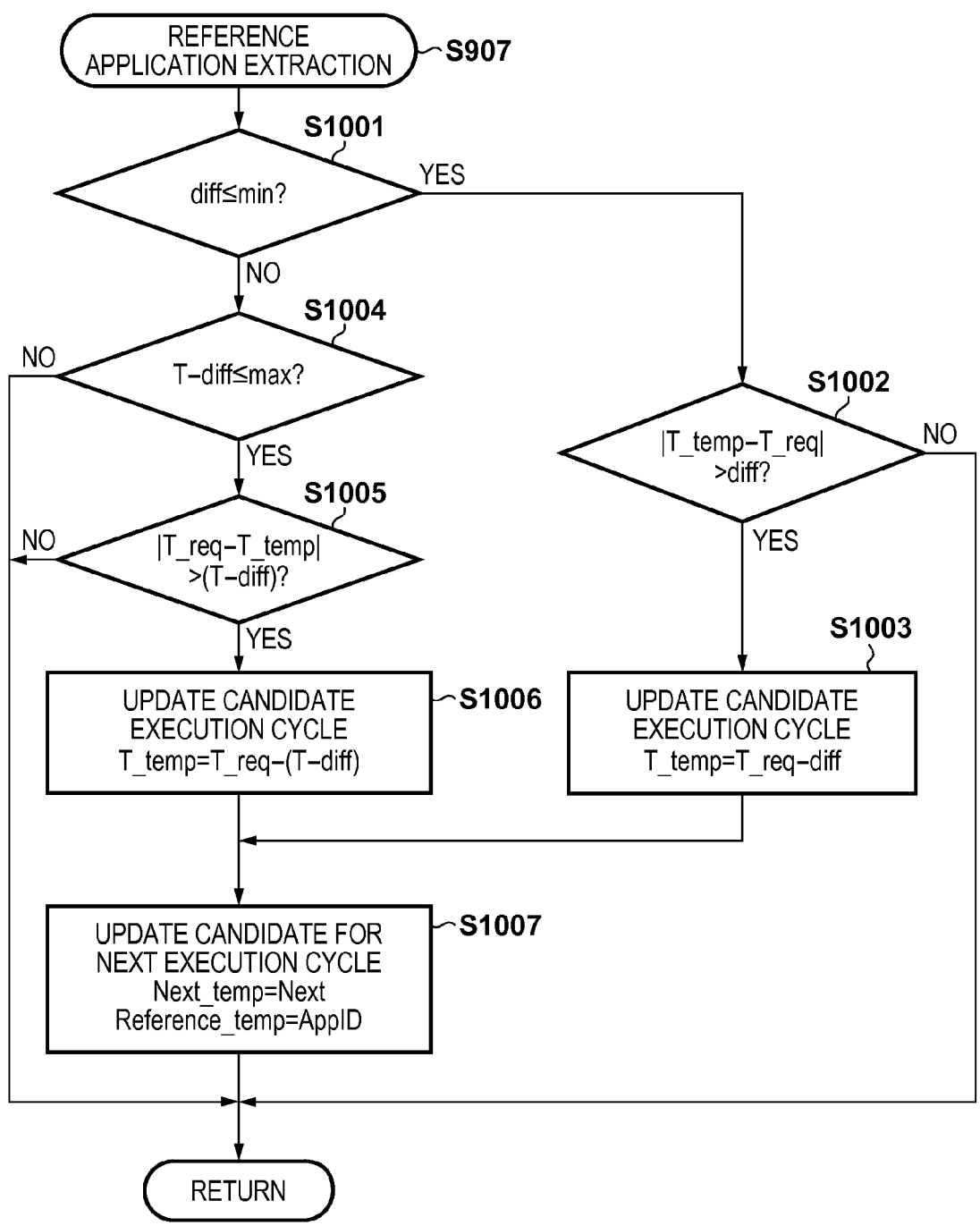
FIG. 10 is a flowchart describing a reference application extraction process in S907 of FIG. 9.

FIG. 10 is a flowchart describing a reference application extraction process in S907 of FIG. 9.

First, in S1001, the table management unit 402 determines whether the above-mentioned difference (diff) is equal to or smaller than the reducible range. That is, if the value of the variable diff is equal to or smaller than the variable min, it is determined that the difference is equal to or smaller than the reducible range. In this case, it can be seen that an application whose execution cycle is within the modifiable range (reducible range) of the requested cycle has been found. If it is determined in S1001 that the difference is equal to or smaller than the reducible range, the table management unit 402 goes to S1002 and determines whether the difference (diff) is smaller than the absolute value of the difference between the variable T_req (requested cycle) and variable T_temp (execution cycle). That is, it is determined here whether the remainder represented by the variable diff is smaller than the absolute value of the difference between an application's candidate execution cycle already calculated and saved temporarily and the requested cycle. If it is determined here that the remainder is smaller, the table management unit 402 goes to S1003 and determines that the calculated candidate execution cycle is closer to the requested cycle than is the temporarily saved candidate execution cycle. In S1003, the table management unit 402 updates the candidate execution cycle. That is, the table management unit 402 sets the value obtained by subtracting the value of the variable diff from the variable T_req (requested cycle) in the variable T_temp (execution cycle) and goes to S1007. On the other hand, if it is determined in S1002 that the difference is not smaller than the absolute value of the difference between the variable T_req and variable T_temp, the process of extracting the reference application is finished.

Also, if it is determined in S1001 that the difference (diff) is larger than the reducible range, the table management unit 402 goes to S1004 and determines whether the value obtained by subtracting the difference (diff) from the variable T (execution cycle) is equal to or smaller than the extendable range. That is, if the difference between the variable T (execution cycle) and variable diff is equal to or smaller than the variable max, it is determined that the difference is equal to or smaller than the extendable range. It is determined here whether the difference between the execution cycle of one record acquired in S904 described above and represented by the variable T and the variable diff is equal to or smaller than the variable max. If the determination here is "true", this means that an appropriate execution cycle has been found within the modifiable range (extendable range) from the requested cycle, and the table management unit 402 goes to S1005. On the other hand, if it is determined in S1004 that the difference between variable T and variable diff is larger than the variable max, the process of extracting the reference application is finished.

In S1005, the table management unit 402 determines whether the difference between the variable T and variable diff is smaller than the absolute value of the difference between the variable T_req and variable T_temp. That is, it is determined here whether the difference between the variable T (execution cycle) and the remainder represented by the variable diff is smaller than the absolute value of the difference between the requested cycle and the candidate execution cycle already calculated and saved temporarily. If it is determined here that the difference between the variable T and remainder is smaller, this means that the calculated candidate execution cycle is closer to the requested cycle than is the temporarily saved candidate execution cycle. In this way, if it is determined in S1005 that the difference between the variable T and variable diff is smaller than the absolute value of the difference between the variable T_req and variable T_temp, the table management unit 402 goes to S1006. In S1006, the table management unit 402 updates the candidate execution cycle. That is, the table management unit 402 subtracts the value of the variable diff from the variable T, further adds the resulting value to the variable T_req (requested cycle), and sets the calculated sum in the variable T_temp, and goes to S1007. On the other hand, if it is determined in S1005 that the value obtained by subtracting the variable diff from the variable T is not smaller than the absolute value of the difference between the variable T_req and variable T_temp, the process of extracting the reference application is finished.

In S1007, since a candidate for the reference application has been determined, the table management unit 402 updates the next execution date/time of the application. That is, the value of the variable Next is set in the variable Next_temp and the value of the variable AppID is set in the variable Reference_temp, and the process is finished.

In this way, according to the first embodiment, the execution cycle of the application requesting to be registered can be registered by being adjusted within an allowable range of the requested cycle so as to coincide with the execution cycle, or an integer multiple thereof, of an already registered application. This allows the execution cycles to be synchronized between registered applications. This makes it possible to solve the problem in that when plural applications are being executed, the number of times the periodic processes of the applications have to return from power saving mode grows and spoils the effect of power saving.

According to the first embodiment, at the time of registration, an application which performs a periodic process is adjusted to an interval, or an integer multiple thereof, in a periodic process of an already registered application. Consequently, the next execution date/time can be made to coincide with the already registered application, making it possible to reduce the number of times the periodic processes have to return from power saving mode.

Second Embodiment

Next, a second embodiment of the present invention will be described. In the second embodiment, description will be given of a case in which there is an application which is not registered with the period for execution of its periodic process being adjusted. Such applications include, for example, a monitoring application which regularly acquires status from a PC to an MFP. Only the differences from the first embodiment will be described here for simplicity of explanation. Note that configurations and the like of a system and MFP according to the second embodiment are the same as the first embodiment described above, and thus description thereof will be omitted.

Figure 4B:
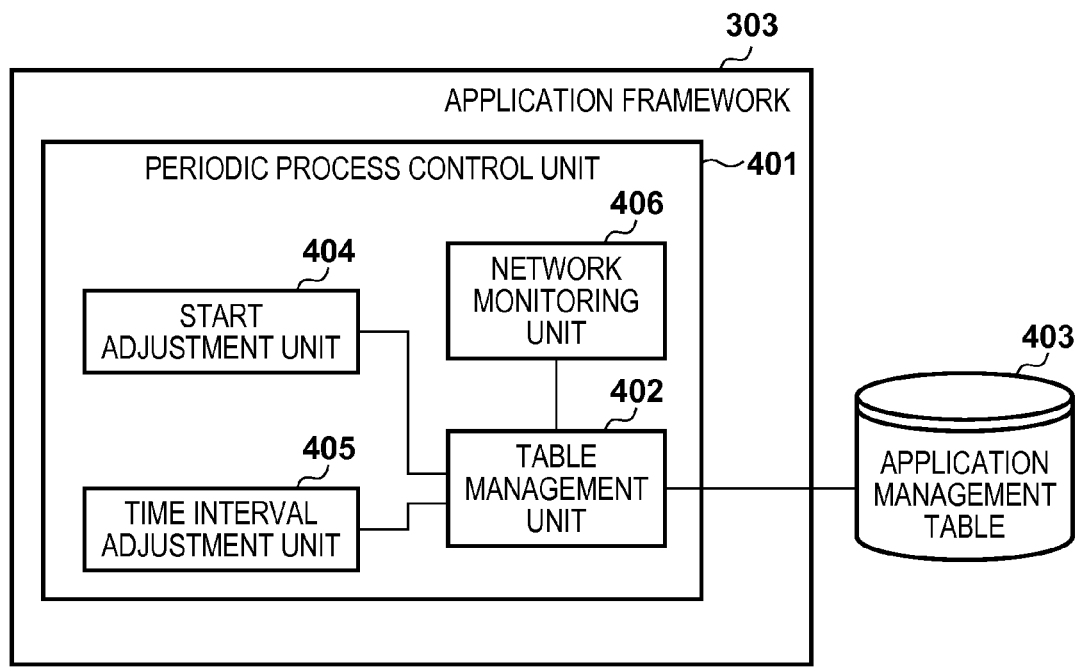

FIG. 4B is a block diagram showing a configuration example of a periodic process control unit 401 according to the second embodiment of the present invention, where components in common with FIG. 4A described above are denoted by the same reference numerals as the corresponding components in FIG. 4A.

A network monitoring unit 406 is newly provided here. The network monitoring unit 406 monitors packets received from the network 104 via the interface unit 206, and asks the table management unit 402 to register any detected periodic process in the application management table 403.

Figure 11:
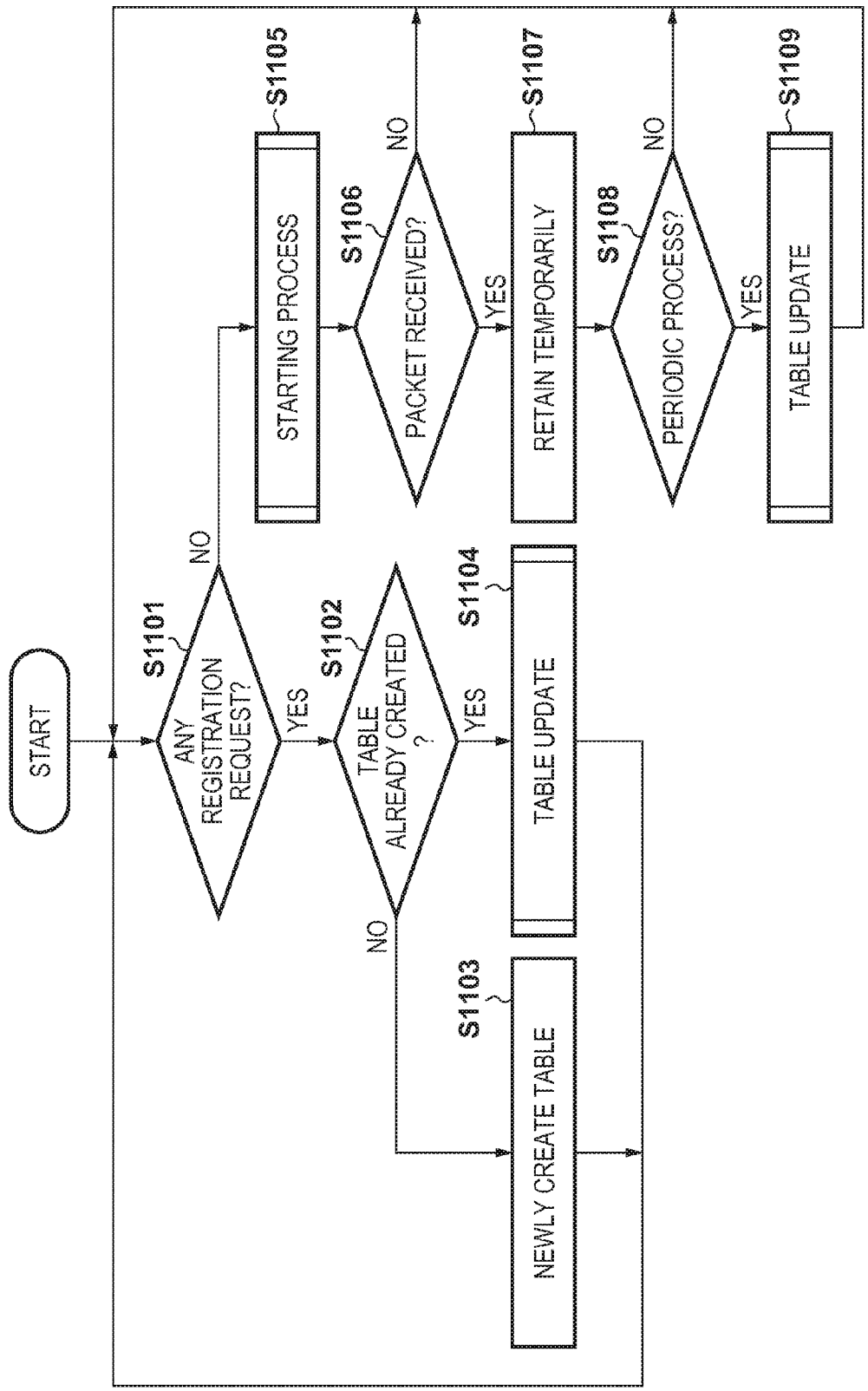
FIG. 11 is a flowchart describing basic processes of the periodic process control unit according to the second embodiment.

FIG. 11 is a flowchart describing basic processes of the periodic process control unit 401 according to the second embodiment.

S1101 to S1104 and S1105 in FIG. 11 are the same as S701 to S704 and S705 in FIG. 7 of the first embodiment described above, and thus description thereof will be omitted.

In S1106, the network monitoring unit 406 determines whether a packet has been received. Data received from the network 104 via the interface unit 206 is checked by the application framework 303 here. Now, if a packet in predetermined format has been received, the network monitoring unit 406 determines that a packet has been received. If it is determined here that a packet has not been received, the network monitoring unit 406 goes to S1101. When it is determined in S1106 that a packet has been received, the network monitoring unit 406 goes to S1107 and temporarily retains the packet information received in S1106 in the RAM 212.

FIG. 12 is a diagram showing an example of packet information retained temporarily in S1107.

The packet information is retained as appropriate in a work area provided beforehand in the RAM 212. Available records include From 1201, Processing Details 1202, Protocol 1203, Previous Execution Date/Time 1204, Average Time Interval 1205, and Reception Count 1206. From 1201 represents the sender of a packet and Processing Details 1202 represent details of a periodic process. Protocol 1203 represents a transmission protocol of the packet, Previous Execution Date/Time 1204 represents the previous reception date/time, Average Time Interval 1205 represents an average of packet reception time intervals, and Reception Count 1206 represents the number of receptions. For example, information registered in row 1211 indicates that status acquisition packets were received from IP address "172.10.10.10" ten times in total at average time intervals of 600 seconds using SNNP protocol and that the previous reception date/time was "6/30 10:05:11".

If there is an entry which coincides in From, Processing, and Protocol with the packet received in S1106, 1 is added to "Reception Count" in the record and the previous execution date/time and average time interval are set. On the other hand, if there is no identical entry, a row is newly added and items are set.

Next, in S1108, the network monitoring unit 406 determines whether the packet information temporarily saved in S1107 indicates a periodic process. That is, if the value of Reception Count 1206 in packet information saved temporarily exceeds a predetermined number of times, it is determined that the packet information indicates a periodic process. For example, when the reception count exceeds ten, it is determined that a periodic process is involved. If it is determined in S1108 that a periodic process is not involved, the network monitoring unit 406 goes to S1101, but when it is determined that a periodic process is involved, the network monitoring unit 406 goes to S1109 to update the application management table 403 and then goes to S1101.

Figure 13:
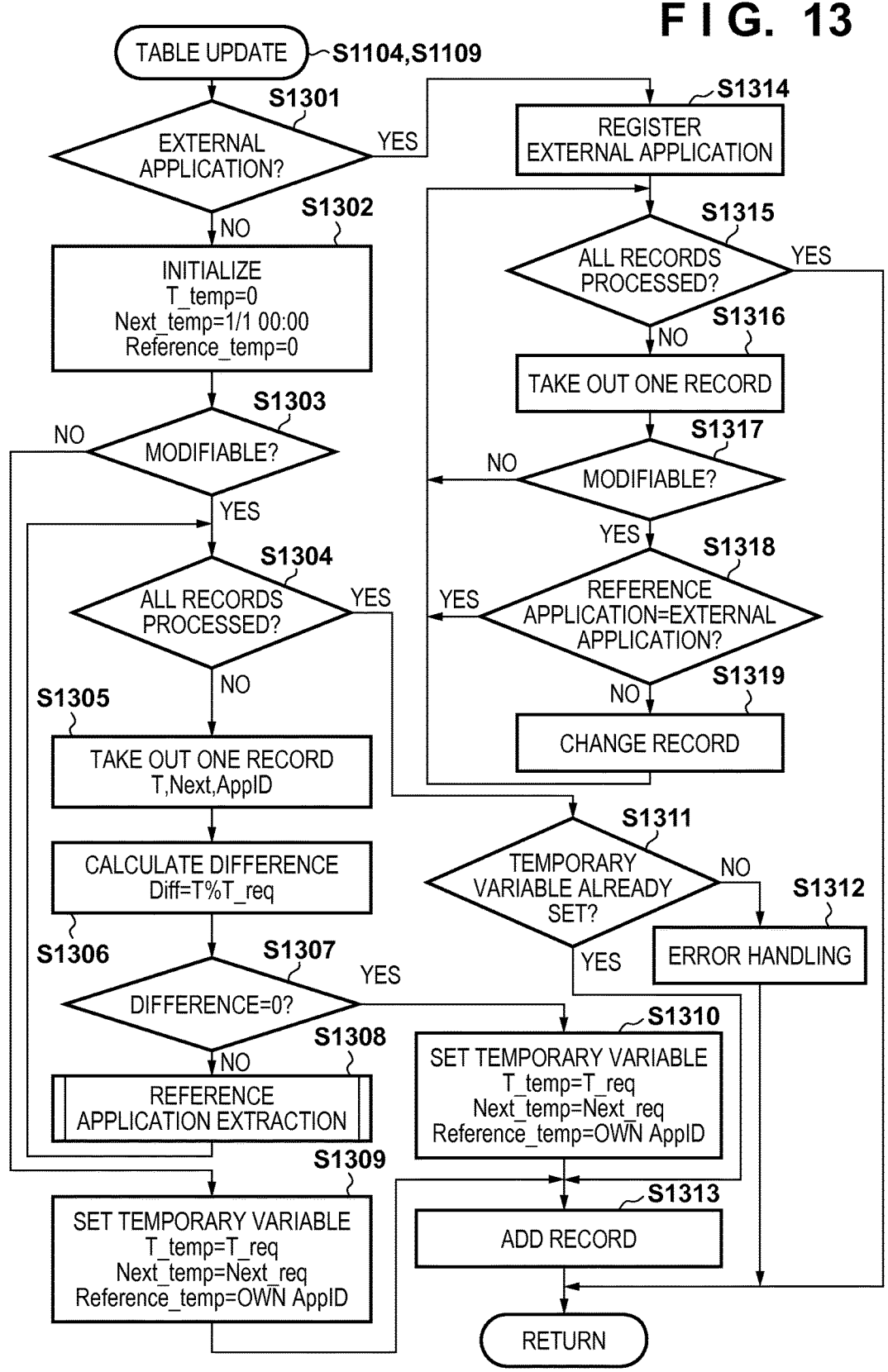
FIG. 13 is a flowchart describing a table update process of S1109 and S1104 according to the second embodiment.

FIG. 13 is a flowchart describing a table update process of S1109 and S1104 according to the second embodiment. Note that the processes of S1302 to S1313 in FIG. 13 are the same as S901 to S912 in FIG. 9 according to the first embodiment, and thus description thereof will be omitted. It is assumed that information needed for registration in the application management table 403 has been passed from the network monitoring unit 406 to the table management unit 402.

First, in S1301, the table management unit 402 determines whether there is a request for registration of an external application. It is determined here whether a trigger calling a table update process is a registration request from an application or an update request from the network monitoring unit 406. In the case of an update request from the network monitoring unit 406, it is determined to be a request for registration of an external application. If it is determined in S1301 that the request is not a request for registration of an external application, the table management unit 402 goes to S1302 and executes the process described with reference to FIG. 9.

If it is determined in S1301 that the request is a request for registration of an external application, the table management unit 402 goes to S1314 and registers the external application in the application management table 403.

FIG. 5D shows data in the application management table 403 in which an external application has been registered. Row 514 shows a registered external application. Here, "No" has been set in Modifiability 505, indicating unmodifiability, "0" has been set in Reducible Range 506, "0" has been set in Extendable Range 507, and "004", which is the own application ID, has been set in Reference App ID 508.

Next, in S1315, the table management unit 402 determines whether all the records in the application management table 403 have undergone the process of S1316 and subsequent processes described later. If it is determined in S1315 that all the records have been processed, the table update process is finished. If it is determined in S1315 that all the records have not been processed, the table management unit 402 goes to S1316 and acquires one record of information on an already registered application from the application management table 403. Furthermore, the table management unit 402 stores the acquired one record of information in the RAM 212. Next, in S1317, the table management unit 402 checks data of the one record acquired in S1316 and determines whether the execution cycle is modifiable. If it is determined in S1317 that the execution cycle is not modifiable, the table management unit 402 goes to S1315. If it is determined in S1317 that the execution cycle is modifiable, the table management unit 402 goes to S1318 and determines whether the reference application is an external application. If it is determined in S1318 that the reference application is an external application, the table management unit 402 goes to S1315, but otherwise the table management unit 402 goes to S1319. In S1319, the table management unit 402 changes a value of the record acquired in S1316 and updates the application management table 403 with the changed value. That is, the table management unit 402 sets Reference App ID to the ID of the external application registered in S1314, and then calculates and sets the execution cycle.

Rows 511 to 513 in FIG. 5D shows an example of data changed in this way. Here, Reference App ID 508 has been changed to ID "004" which indicates an external application and Execution Cycle 503 has been re-set to the execution cycle (590 sec.) or an integer multiple (1180 sec.) thereof of the external application.

As described above, according to the second embodiment, when there is an application whose periodic process interval cannot be changed, the periodic process of another application can be made to coincide with the execution cycle of the periodic process of the former application.

Third Embodiment

Next, a third embodiment of the present invention will be described. Generally, to avoid network overload by reducing operating loads of information processing apparatus and MFPs, processing is performed in a distributed manner. Although the above embodiment achieves power saving by making the timings of periodic processes coincide with each other, this can contribute to increasing the network load as well as the operating load of the apparatus. Thus, an example of reducing the network load while achieving power saving will be described. Note that configurations and the like of a system and MFP according to the third embodiment are the same as the first embodiment described above, and thus description thereof will be omitted.

FIG. 14 is a diagram showing an example of an application management table 403 according to the third embodiment, where components in common with FIGS. 5A to 5D described above are denoted by the same reference numerals as the corresponding components in FIGS. 5A to 5D.

Delay Time 1401 is added to the application management table 403 by being associated with periodic processes. Delay Time 1401 indicates the delay time from the next execution date/time already set in the application management table 403 to the time when the periodic process is performed.

The delay time is automatically set at a random value when the application management table 403 is newly created in S703 or the application management table 403 is updated in S704. An available range of the delay time is, for example, within 10% (inclusive) of the execution cycle and does not exceed a continuous idle time which serves as a criterion for entering a sleep mode when the started MFP remains idle for a predetermined time.

In row 1411 of FIG. 14, Delay Time 1401 is set at "0", and thus in the starting process of S705, the application is instructed to start by the periodic process control unit 401 without delay. On the other hand, in row 1412, Delay Time 1401 is set at 10 seconds, meaning that the periodic process is started 10 seconds after the time in Next Execution Date/Time 502.

As described above, according to the third embodiment, plural periodic processes having equal periods can be performed by being shifted from each other. Consequently, even if periodic processes involve communications via a network, the network load can be distributed and a peak value of the network load can be reduced.

Also, loads on the CPU which performs periodic processes can be distributed and the load peak value can be reduced. This makes it possible to reduce power consumption of the MFP.

The present invention makes it possible to execute periodic processes of plural applications in synchronization, thereby reduce the number of times, for example, the periodic processes have to return from power saving mode, and thereby reduce factors which obstruct reduction of power consumption.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) (TM)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-127599 filed Jun. 20, 2014, which is hereby incorporated by reference herein in its entirety.

What is claimed is:

1. A processing apparatus capable of registering applications which periodically execute processes, the apparatus comprising:
a processor implementing functions of:
a management unit configured to manage one of a plurality of applications which have been registered with the processing apparatus, as a reference application;
a registration unit configured to register a new application with the processing apparatus;
a determination unit configured to determine whether or not a next execution date/time and an execution cycle of the new application are modifiable, wherein the execution cycle indicates a time period from a starting time of a given execution of an application to a starting time of a next execution of that application after the given execution;
a setting unit configured to set the next execution date/time and the execution cycle of the new application so that the next execution date/time of the new application matches the next execution date/time of the reference application and so that the execution cycle of the new application matches the execution cycle of the reference application or an integer multiple of the execution cycle of the reference application, in a case where it is determined that the next execution date/time and the execution cycle of the new application are modifiable; and
a changing unit configured to change the reference application managed by said management unit to the new application in a case where it is determined that the next execution date/time and the execution cycle of the new application are not modifiable.

2. The processing apparatus according to claim 1, wherein when the reference application is changed to the new application by said changing unit, said setting unit re-sets the next execution dates/times and the execution cycles of the applications already registered with the processing apparatus, based on the next execution date/time and the execution cycle of the new application.

3. The processing apparatus according to claim 1, wherein said setting unit sets the next execution date/time and the execution cycle of the new application based on an allowable range of the next execution date/time and the execution cycle requested by the new application and the next execution date/time and the execution cycle of the reference application.

4. The processing apparatus according to claim 1, wherein the processing apparatus is a printing apparatus configured to perform printing.

5. A method for controlling a processing apparatus capable of registering applications which periodically execute processes, the method comprising:
managing one of a plurality of applications which have been registered with the processing apparatus, as a reference application;
registering a new application with the processing apparatus;
determining whether or not a next execution date/time and an execution cycle of the new application are modifiable, wherein the execution cycle indicates a time period from a starting time of a given execution of an application to a starting time of a next execution of that application after the given execution;
setting the next execution date/time and the execution cycle of the new application so that the next execution date/time of the new application matches the next execution date/time of the reference application and so that the execution cycle of the new application matches the execution cycle of the reference application or an integer multiple of the execution cycle of the reference application, in a case where it is determined that the next execution date/time and the execution cycle of the new application are modifiable; and
changing the reference application managed in said managing step to the new application in a case where it is determined that the next execution date/time and the execution cycle of the new application are not modifiable.

6. A non-transitory computer-readable storage medium storing a program configured for causing a computer to execute a method for controlling a processing apparatus capable of registering applications which periodically execute processes, the method comprising:
managing one of a plurality of applications which have been registered with the processing apparatus, as a reference application;
registering a new application with the processing apparatus;
determining whether or not a next execution date/time and an execution cycle of the new application are modifiable, wherein the execution cycle indicates a time period from a starting time of a given execution of an application to a starting time of a next execution of that application after the given execution;
setting the next execution date/time and the execution cycle of the new application so that the next execution date/time of the new application matches the next execution date/time of the reference application and so that the execution cycle of the new application matches the execution cycle of the reference application or an integer multiple of the execution cycle of the reference application, in a case where it is determined that the next execution date/time and the execution cycle of the new application are modifiable; and
changing the reference application managed in said managing step to the new application in a case where it is determined that the next execution date/time and the execution cycle of the new application are not modifiable.

* * * * *